(12) United States Patent
Killinger et al.

(10) Patent No.: US 9,625,046 B2
(45) Date of Patent: Apr. 18, 2017

(54) VALVE FOR OPENING A FLUID LINE

(71) Applicant: Astrium GmbH, Taufkirchen (DE)

(72) Inventors: Rainer Killinger, Recklinghausen (DE); Markus Wolf, Bad Wimpfen (DE); Thomas Maier, Lauffen (DE)

(73) Assignee: Astrium GmbH, Taufkirchen (DE)

( * ) Notice: Subject to any disclaimer, the term of this patent is extended or adjusted under 35 U.S.C. 154(b) by 186 days.

(21) Appl. No.: 14/173,481

(22) Filed: Feb. 5, 2014

(65) Prior Publication Data

US 2014/0217313 A1    Aug. 7, 2014

(30) Foreign Application Priority Data

Feb. 6, 2013   (DE) ........................ 10 2013 001 992

(51) Int. Cl.
| | | |
|---|---|---|
| *F16K 31/00* | (2006.01) | |
| *B64G 1/40* | (2006.01) | |
| *F16K 31/02* | (2006.01) | |

(52) U.S. Cl.
CPC ............ *F16K 31/002* (2013.01); *B64G 1/402* (2013.01); *F16K 31/025* (2013.01)

(58) Field of Classification Search
CPC .... F16K 31/002; F16K 31/025; F16K 99/003; F16K 99/0032; F16K 99/0036; F16K 2099/0084; F16K 99/044; F16K 13/10; B64G 1/402; Y10T 137/1827; Y10T 137/1812; Y10T 137/1797; Y10T 137/2191; Y10T 137/2196; Y10T 137/2202; B01L 2400/0677

USPC ........ 251/11; 220/89.4; 137/72, 74, 76, 827, 137/828, 829
See application file for complete search history.

(56) References Cited

U.S. PATENT DOCUMENTS

| | | | |
|---|---|---|---|
| 328,008 A | 10/1885 | Conner et al. | |
| 3,528,449 A | 9/1970 | Witte et al. | |
| 4,046,157 A | 9/1977 | Cazalaa et al. | |
| 4,273,251 A | 6/1981 | McMahon | |
| 4,949,742 A * | 8/1990 | Rando | F16K 13/10 137/13 |
| 5,419,357 A | 5/1995 | Lhymn et al. | |
| 6,557,575 B1 * | 5/2003 | Gerhardt | B01L 3/502738 137/13 |

(Continued)

FOREIGN PATENT DOCUMENTS

| | | |
|---|---|---|
| DE | 25 49 060 A1 | 5/1976 |
| EP | 1 821 015 A1 | 8/2007 |

(Continued)

OTHER PUBLICATIONS

European Search Report dated May 22, 2014 including partial English translation (Seven (7) pages).

*Primary Examiner* — Michael R Reid
(74) *Attorney, Agent, or Firm* — Crowell & Moring LLP

(57) ABSTRACT

A valve for one-time opening a fluid line for venting a technical system includes an inlet for connecting to the fluid line, an outlet, and a controllable closure arranged between the inlet and the outlet. In the non-activated state the controllable closure closes a passage between the inlet and the outlet. The closure includes a material that changes its phase state in dependence on a control parameter, whereby the passage is irreversibly opened in the activated state.

15 Claims, 3 Drawing Sheets

(56) References Cited

U.S. PATENT DOCUMENTS

Figure 1:
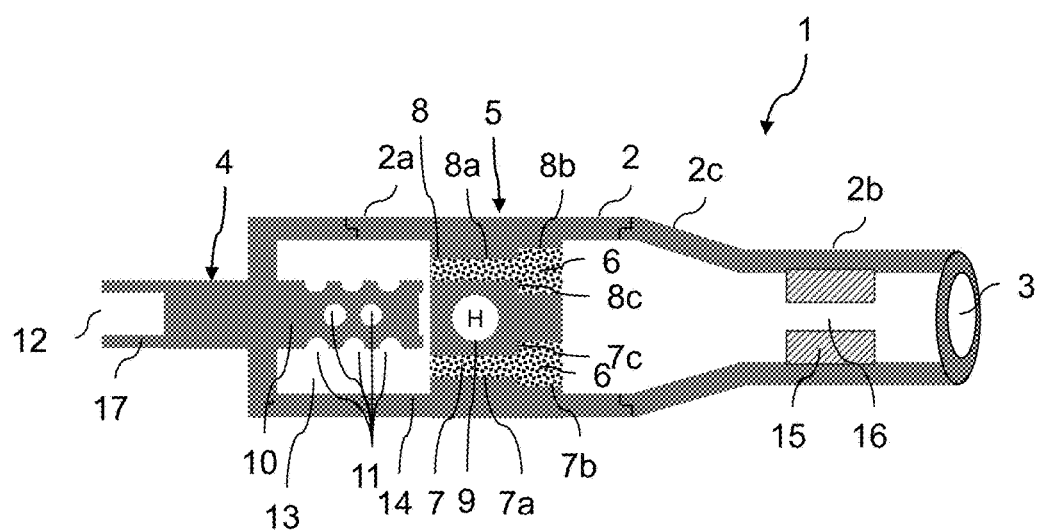

| | | | |
|---|---|---|---|
| 2004/0007275 A1* | 1/2004 | Hui Liu | B01L 3/502738 137/828 |
| 2004/0040302 A1 | 3/2004 | Winkler | |
| 2006/0115697 A1* | 6/2006 | Nakakubo | 429/22 |

FOREIGN PATENT DOCUMENTS

| | | |
|---|---|---|
| GB | 838087 | 6/1960 |
| JP | 2005-345276 A | 12/2005 |
| WO | WO 2006/086440 A2 | 8/2006 |

* cited by examiner

VALVE FOR OPENING A FLUID LINE

CROSS REFERENCE TO RELATED APPLICATIONS

The present application claims priority under 35 U.S.C. §119 to German application number 10 2013 001 992.3, the entire disclosure of which is herein expressly incorporated by reference.

BACKGROUND AND SUMMARY OF THE INVENTION

Exemplary embodiments of the present invention relate to a valve for one-time opening of a fluid line, in particular for venting a technical system. The invention further relates to a technical system, in particular of a spacecraft component.

Valves adapted for switching only a single time are frequently used in space travel. The function of the valves is to ensure a defined opening or closing of a fluid line at a given time. For this purpose, the valves have an actuator. In most cases, pyrotechnical igniters are used as actuators. A disadvantage of such actuators is that when actuating them, a so-called gyro-shock occurs, which can damage other components of the technical system. Pyrotechnical igniters normally have a limited warranted lifetime of, for example, 8 years. Since spacecrafts such as, for example, communication satellites typically stay longer than 15 years in geostationary orbit, a reliable actuation of the valve at the end of the lifetime of the system is not ensured.

Currently, one-time-switching valves on the basis of wax actuators are under development. In these actuators, a preloaded spring is embedded in wax. The solidified wax prevents the spring from relaxing. For actuating the valve, the wax is heated and thus liquefied. Due to the liquefied wax, the spring is no longer blocked and the actuator opens the cap of a capillary tube, for example by means of shear forces. The function of such an actuator requires the presence of a shear blade.

Exemplary embodiments of the present invention are directed to a valve that is to be opened only once and that allows in a cost-effective and reliable manner to open a fluid line, in particular for venting a technical system.

In accordance with the present invention the valve comprises an inlet for connecting to the fluid line, an outlet, and a controllable closure. The controllable closure is arranged between the inlet and the outlet and closes in the non-activated state a passage between the inlet and the outlet. The closure comprises a material that changes its phase state depending on a control parameter, as a result of which the passage is irreversibly opened in the activated state.

The valve according to the invention enables the one-time opening of a fluid line without a mechanical actuator. Through this, the valve can be produced with low complexity and therefore at low costs. Its reliable function is ensured over a lifetime of more than 15 years, as required in space applications.

The technical system can involve, for example, a space travel downthrust system with storable fuels. The proposed valve can be used, for example, to passivate satellite tanks and satellite lines, which serve for providing fuel and compressed gas, at the end of a mission. Through this, explosions can be prevented during a later re-entry of the spacecraft or in the event of debris impacts.

According to an advantageous configuration, the phase change of the material (so-called phase-change material) can be effected by heat supply, wherein the material transitions under heat supply from a solid state into a liquid state and thereby opens the closure. In order to achieve the phase change of the material, a so-called phase-change temperature has to be reached. The material is preferably selected such that the difference between an ambient temperature or an operating temperature of the valve and the phase-change temperature excludes unintentional actuation of the valve. Such unintentional actuation could be caused by solar radiation or waste heat of other components. Expediently, the phase-change material comprises a metal or consists of metal. Preferably, indium is used, which has a melting temperature of more than 157° C. and therefore meets the requirements placed upon space travel applications. The concept of metal is to be interpreted broadly. It is in particular to be understood that this also includes metal alloys.

According to a further advantageous configuration, the closure comprises a heating device that can be switched on by means of a control device so as to activate the closure. By means of the heating device, the material can be brought from the solid state, in which the closure closes a passage between the inlet and the outlet, into a liquid or gaseous aggregation state, whereby the one-time opening of the valve is enabled. The heating device can be configured as a resistance heating. A resistance heating system is known in fields related to space travel applications, for example, in connection with hydrazine jet engines. Such a heating device comprises a heating element, a feed line and an electrical connection.

Expediently, the heating device in the closure is arranged in spatial proximity to the phase-change material. This ensures that the reaction time for changing the phase state of the phase-change material is short.

In the non-activated state of the valve, the phase-change material closes at least one passage channel of the closure. In other words, this means that the closure has one or a plurality of passage channels in which, in the non-activated state, the solid phase-change material is arranged. After activating the valve, the fluid contained in the fluid lines flows through the passage channel or channels for venting the technical system.

According to an advantageous configuration, a wall of the at least one passage channel, in a longitudinal section through the closure or through the evacuation valve, is formed to be conical or stepped at least in sections so that the material is pressed against the wall by the pressure prevailing in the technical system. This ensures that the pressure prevailing during the operation of the technical system cannot displace the sealing phase-change material when the evacuation valve is not activated, which otherwise could result in leakages of the technical system.

In a further configuration, the outlet has an outlet nozzle that has at least one opening, wherein the outlet nozzle protrudes into a volume of the valve, which volume is arranged between the passage and the outlet, wherein the material that is liquefied by activation can be absorbed by the volume, and the at least one opening of the outlet nozzle is fluidically connected to the inlet by passing through the passage. Here, the at least one opening is connected to an exit of the outlet. The volume formed in the housing of the valve thus is dimensioned in terms of its size in such a manner that the material that changes its phase state during heating can be completely absorbed by said volume. At the same time, the outlet nozzle is arranged in the volume in such a manner that the at least one opening of the outlet nozzle is not closed by the phase-change material, and the connection between the inlet of the evacuation valve and the outlet of the evacuation valve is therefore ensured.

The outlet can be formed such that it has at its exit a tube for connecting. Alternatively, the outlet can comprise a nozzle at its exit. The nozzle can be connected here as a separate component to the outlet of the evacuation valve. Likewise, the outlet of the evacuation valve can be configured such that the exit of the outlet has the shape of a nozzle. In a further variant, the outlet can comprise at its exit a plurality of outlets which enables the fluid to discharge symmetrically, in particular along a longitudinal axis of the evacuation valve. This ensures that during discharging of the fluid, no thrust vector or no moment is generated that acts on the technical system, for example, a satellite or a spacecraft. Such an arrangement is also designated as "zero-force-outlet".

For limiting the fluid flow rate when the valve is open, an orifice can be arranged between the inlet and the closure. This orifice limits the cross-section through which the fluid can flow during venting of the technical system. Corresponding to this, alternatively or additionally, an orifice for limiting the fluid flow rate can also be arranged between the outlet and the closure.

When reference to a fluid is made in the present description, this is to be understood as both a liquid medium and a gaseous medium, for example, a fuel.

The technical system involves in particular a spacecraft component that comprises an evacuation valve that is configured as described above. Here, as long as the valve is not open, the medium in the technical component is typically pressurized.

BRIEF DESCRIPTION OF THE DRAWING FIGURES

Figures 2, 3:
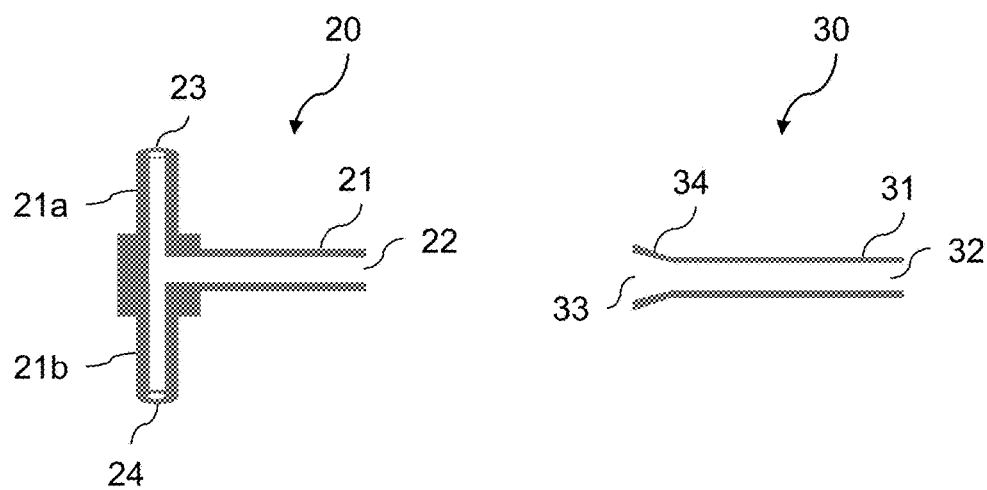
Figure 1A:
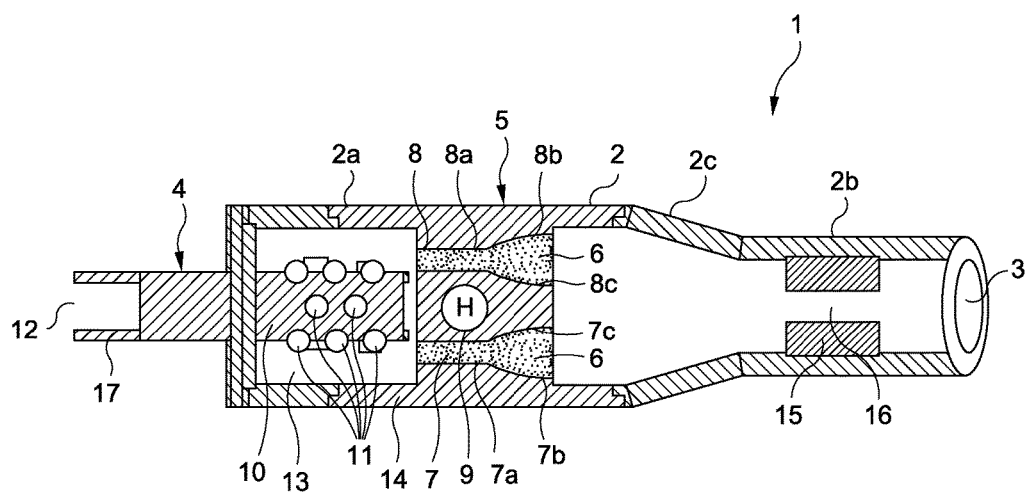
Figure 4:
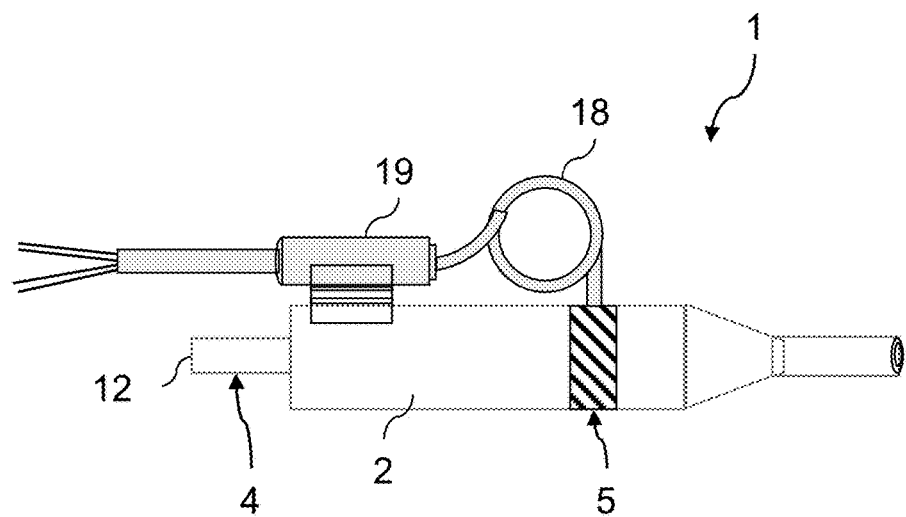
Figure 5:
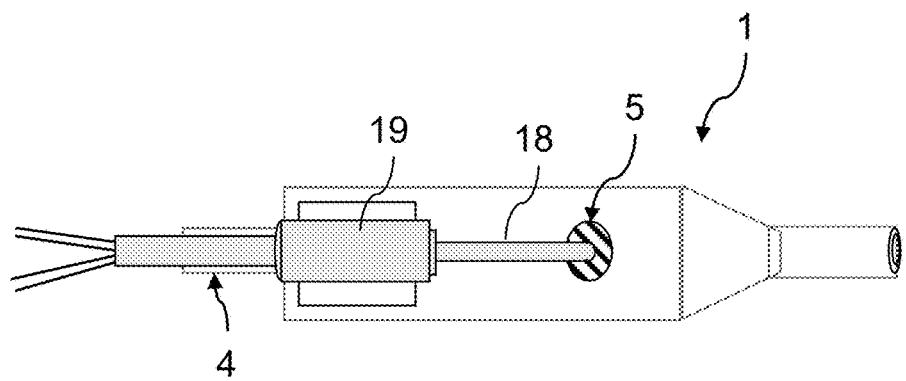

The invention is explained in greater detail below by means of an exemplary embodiment in the drawing. In the figures:

FIG. 1 shows a schematic cross-sectional illustration of a valve according to the invention in the form of an evacuation valve, FIG. 1a shows another schematic cross-sectional illustration of a valve according to the invention in the form of an evacuation valve, FIG. 2 shows a schematic illustration of a zero-force-outlet that can be arranged at an outlet of the evacuation valve, FIG. 3 shows a nozzle for arranging at the outlet of the evacuation valve shown in FIG. 1, FIG. 4 shows a schematic illustration of an evacuation valve according to the invention in a side view, in which components of a heating device are shown, and FIG. 5 shows a top view onto the evacuation valve of FIG. 4.

DETAILED DESCRIPTION

FIG. 1 shows a schematic cross-sectional illustration of an evacuation valve 1 according to the invention. The evacuation valve 1 comprises a housing 2. The housing 2 consists of a first housing section 2a and a second housing section 2b. The two housing sections 2a, 2b are connected to one another by a connecting section 2c. The first and second housing sections 2a, 2b, for example, have a circular cross-section. The diameter of the first housing section 2a in the exemplary embodiment is larger than the cross-section of the second housing section 2b, although this not required.

This results in a conical shape of the housing section 2c. In the exemplary embodiment, the diameter of the second housing section 2b is dimensioned according to the cross-section of an inlet 3 of the evacuation valve 1. At its opposite end, the housing 2 has an outlet 4. The inlet 3 is connected to a fluid line (not illustrated) of a technical system, for example, a space propulsion. The outlet 4 is fluidically connected to the surroundings or another piping system or container.

Between the inlet 3 and the outlet 4, a controllable closure 5 is arranged. The closure 5 has at least one passage channel 7, 8. In the illustration of FIG. 1, two passage channels 7, 8 are shown. Between the two passage channels 7, 8, a heating device 9 is arranged in the closure. The two passage channels 7 are filled with a phase-change material 6. The phase-change material 6 consists in general of a solid meltable material. Preferably, a metal such as, for example, indium is used as a phase-change material. The melting temperature of indium is above approximately 157° C. A phase change of the phase-change material 6 thus only takes place upon activation, but not due to solar radiation or waste heat of other components in the proximity of the evacuation valve. This is ensured by the sufficiently large temperature difference between ambient temperature/operating temperature of the evacuation valve and the phase-change temperature.

If the heating device 9 is not in operation, the phase-change material 6 keeps its solid form. By putting the heating device 9 into operation, the phase-changing material 6 is made to melt. In the housing 2, between the outlet 4 and the closure 5, a volume 13 is provided into which the molten phase-change material can flow. The volume 13 is a closed intermediate space between the outlet 4 and the closure 5. The outlet 4 comprises an outlet nozzle 10 that protrudes into the volume 13. The outlet nozzle 10 comprises, at least on the outer circumference, one or more openings 11 which are connected to an exit 12 of the outlet nozzle 10. The exit 12 is connected with the surroundings or another piping system or container.

Upon activating the heating device 9, the phase-change material 6 is liquefied and is flushed into the volume 13 by means of a residual pressure of the technical system, which residual pressure prevails on the inlet side. In the downstream volume 13, the molten phase-change material 6 deposits on the bottom 14 of the volume. The fluid to be discharged can now flow through the openings 11 of the outlet nozzle 10 until the technical system is at ambient pressure.

In order to prevent the evacuation valve 1 from leaking when the heating device is not activated and the evacuation valve therefore is not actuated, the passage channels 7, 8 are configured in such a manner that the solid phase-change material 6 is sealingly pressed against a respective wall of the passage channel 7, 8. In the exemplary embodiment shown in FIG. 1, the passage channels 7, 8 each have a first narrow section 7a, 8a and a second, comparatively wider section 7b, 8b. The resulting step 7c, 8c prevents that the phase-change material can be pressed out of the passage channels 7, 8 when the valve is closed and high pressure prevails in the technical system. On the contrary, the higher the pressure is in the technical system and therefore on the inlet side of the evacuation valve 1, the better the phase-change material 6 is pressed against the walls of the passage channels 7, 8. The same effect can be achieved if the passage channels 7, 8 have a conical shape (see FIG. 1a).

The flow rate of the medium when the evacuation valve 1 is open can be limited by orifices that are optionally arranged at the inlet 3 and/or outlet 4. Only as an example, such an orifice 15 is arranged at the inlet 3. This results in a cross-section 16 that is reduced with respect to the inlet cross-section 3. If such an orifice is to be arranged at the outlet 4, this orifice can be provided at the exit 12 of the outlet nozzle 10.

If the evacuation valve 1 is to be used in space travel applications, it is advantageous to provide the exit 12 of the outlet nozzle with a so-called zero-force outlet 20, which is exemplary shown in FIG. 2. The latter can be connected, for example, to a receptacle 17 of the outlet 4. It is principally also possible to form the zero-force-outlet 20 integrally with the outlet 4 of the evacuation valve 1.

The zero-force-outlet 20 comprises a connecting section 21 which can be inserted into the receptacle 17 of the outlet pipe 4. The type of connection (non-positive- and/or positive-locking fit or adhesive bond) is of subordinate importance here. An inlet 22 is now fluidically connected to the exit 21 of the outlet nozzle 10. In the drawing, two further sections 21a, 21b extend in opposite directions from the connecting section 21 so that the respective outlets 23, 24 enable the fluid to discharge symmetrically. The number of outlets 23, 24 can principally also be selected differently. It only has to be ensured that the fluid discharges symmetrically, in particular with regard to a longitudinal axis of the evacuation valve, which extends in FIG. 1 in the plane of projection from left to right. This ensures that no thrust vector or moment can occur that acts on the technical system.

Alternatively, a nozzle 30 can be connected to the outlet 12. The nozzle 30, which is illustrated in FIG. 3, comprises a connecting section 31 which, in turn, can be connected to the receptacle 17 of the exit 12 of the outlet 4. The connection can be formed in a detachable manner, a non-positive-locking and/or positive-locking manner or firmly bonding manner. Also, the nozzle 30 could be an integral part of the outlet 4. At an end opposite to the inlet 32, an outlet 33 with a nozzle widening 34 is provided.

As described above, the closure 5 is heated by the heating device 9. As is apparent from FIG. 1, the heating device 9 is located in the closure near the phase-change material 6. Heating devices of this type are used, for example, for hydrazine jet engines. The heating device 9 consists of a heating element (H), a heater-inherent feed line 18 and an electrical connection 19. This is schematically illustrated in the FIGS. 4 and 5, wherein FIG. 4 illustrates a side view of the evacuation valve 1 according to the invention, and FIG. 5 illustrates the arrangement from above, with the feed line 18 and the electrical connection 19. The location of the closure with the heating device 9 arranged therein is in each case illustrated hatched and indicated by the reference number 5.

The described evacuation valve has the advantage of low costs, durability, reliable function in the case of activation, and low complexity due to the absence of mechanical elements. The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE LIST

1 Evacuation valve
2 Housing
2a First housing section
2b Second housing section
2c Connecting section
3 Inlets
4 Outlets
5 Closure
6 Phase-change material
7 Passage channel
7a First, narrow section of the passage channel 7
7b Second wide section of the passage channel 7
7c Step
8 Passage channel
8a First narrow section of the passage channel 8
8b Second wide section of the passage channel 8
8c Step
9 Heating device
10 Outlet nozzle
11 Opening
12 Exit of the outlet nozzle
13 Volume
14 Bottom of the volume
15 Orifice
16 Cross-section
17 Receptacle for orifice, nozzle or zero-force-outlet
18 Feed line
19 Electrical connection
20 Zero-force-outlet
21 Connecting section
21a Section
21b Section
22 Inlet
23 Outlet
24 Outlet
30 Nozzle
31 Connecting section
32 Inlet
33 Outlet
34 Nozzle widening

What is claimed is:

1. A spacecraft component, comprising:
a valve for one-time opening a fluid line and venting the spacecraft component, the valve comprising
an inlet connected to the fluid line;
an outlet; and
a controllable closure arranged between the inlet and the outlet, wherein the controllable closure is configured to close a passage between the inlet and the outlet in a non-activated state, wherein the controllable closure comprises a material that changes its phase state depending on a control parameter, and wherein in an activated state the passage is irreversibly opened,
wherein the outlet has an outlet nozzle which protrudes into a volume of the valve, the outlet nozzle comprising a plurality of openings arranged along a longitudinal axis of the outlet nozzle.

2. The spacecraft component according to claim 1, wherein the phase change of the material is effected by heat supply, whereby the phase change material transitions under heat supply from a solid state into a liquid state.

3. The spacecraft component according to claim 1, wherein the phase change material comprises a metal or consists of a metal.

4. The spacecraft component according to claim 3, wherein the metal is indium.

5. The spacecraft component according to claim 1, wherein the controllable closure comprises a heating device configured to be switched on by a control device so as to activate the controllable closure.

6. The spacecraft component according to claim 5, wherein the heating device is arranged in spatial proximity to the phase change material.

7. The spacecraft component according to claim 1, wherein in the non-activated state, the phase change material closes the passage of the controllable closure.

8. The spacecraft component according to claim 1, wherein the outlet has an outlet nozzle that has at least one opening, wherein the outlet nozzle protrudes into a volume of the valve, wherein the volume is arranged between the passage and the outlet, wherein the volume is configured to absorb the phase change material that is liquefied by activation, and the at least one opening of the outlet nozzle is fluidically connected to the inlet by passing through the passage.

9. The spacecraft component according to claim 1, wherein the outlet is formed such that it has a connecting tube at an exit of the outlet.

10. The spacecraft component according to claim 1, wherein the outlet comprises a nozzle at an exit of the outlet.

11. The spacecraft component according to claim 1, wherein an exit of the outlet comprises a plurality of outlets configured for symmetrical discharge of the fluid along a longitudinal axis of the valve.

12. The spacecraft component according to claim 1, further comprising:
an orifice, which is configured to limit fluid flow rate, arranged between the inlet and the controllable closure.

13. A valve for one-time opening a fluid line and venting a technical system, the valve comprising:
an inlet connected to the fluid line;
an outlet; and
a controllable closure arranged between the inlet and the outlet, wherein the controllable closure is configured to close a passage between the inlet and the outlet in a non-activated state, wherein the controllable closure comprises a material that changes its phase state depending on a control parameter, and wherein in an activated state the passage is irreversibly opened,
wherein, in a longitudinal section through the controllable closure of the valve, a wall of the passage surrounding the material is conical or stepped, at least in sections, and
wherein the outlet has an outlet nozzle which protrudes into a volume of the valve, the outlet nozzle comprising a plurality of openings arranged along the longitudinal axis of the outlet nozzle.

14. The valve according to claim 13, wherein the wall of the passage is configured such that the material is pressed against the wall by pressure prevailing in the technical system.

15. A valve for one-time opening a fluid line and venting a technical system, the valve comprising:
an inlet connected to the fluid line;
an outlet; and
a controllable closure arranged between the inlet and the outlet, wherein the controllable closure is configured to close a plurality of passages between the inlet and the outlet in a non-activated state, wherein the controllable closure comprises a material in the plurality of passages that changes its phase state depending on a control parameter, and wherein in an activated state the plurality of passages are irreversibly opened,
wherein the controllable closure comprises a heating device between the plurality of passages.

* * * * *